June 10, 1930.　　　　H. M. BROWN　　　　1,763,611
TIRE LINING APPARATUS
Filed Feb. 9, 1929　　　2 Sheets-Sheet 1
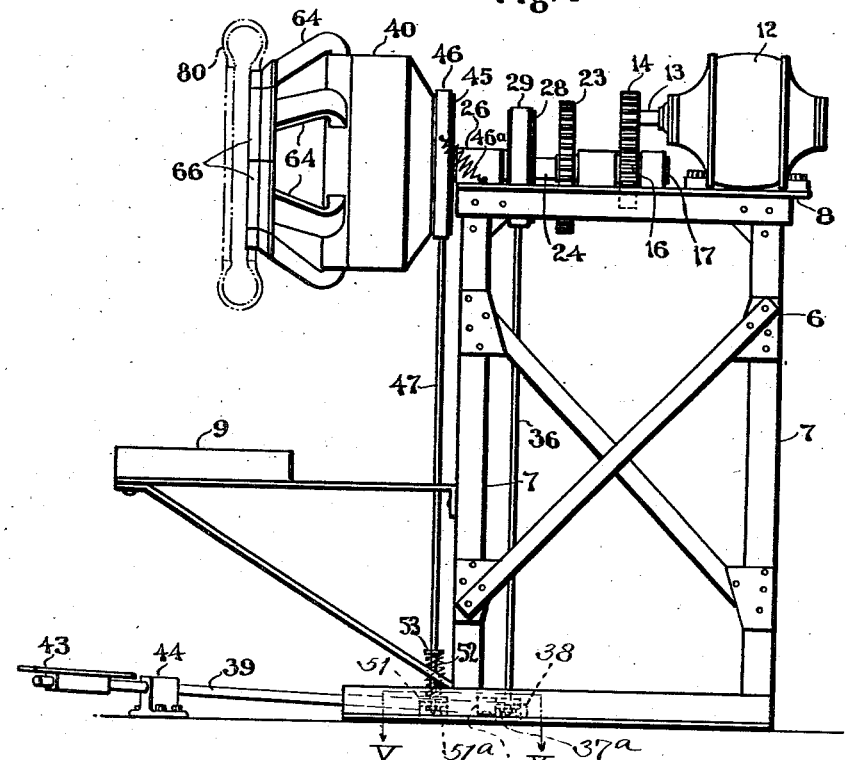
Fig. 1
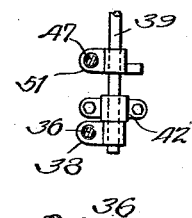
Fig. 5.
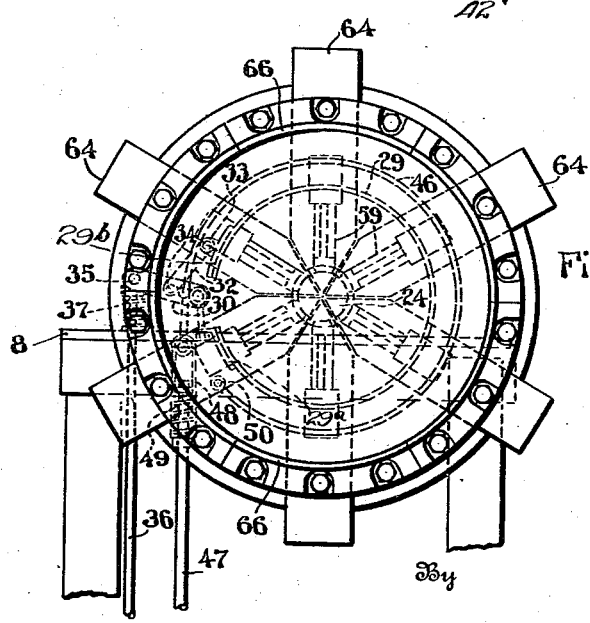
Fig. 4.
Fig. 6.
Inventor
Harold M. Brown.
By
Attorney June 10, 1930.                    H. M. BROWN                    1,763,611
                             TIRE LINING APPARATUS
                             Filed Feb. 9, 1929            2 Sheets-Sheet 2
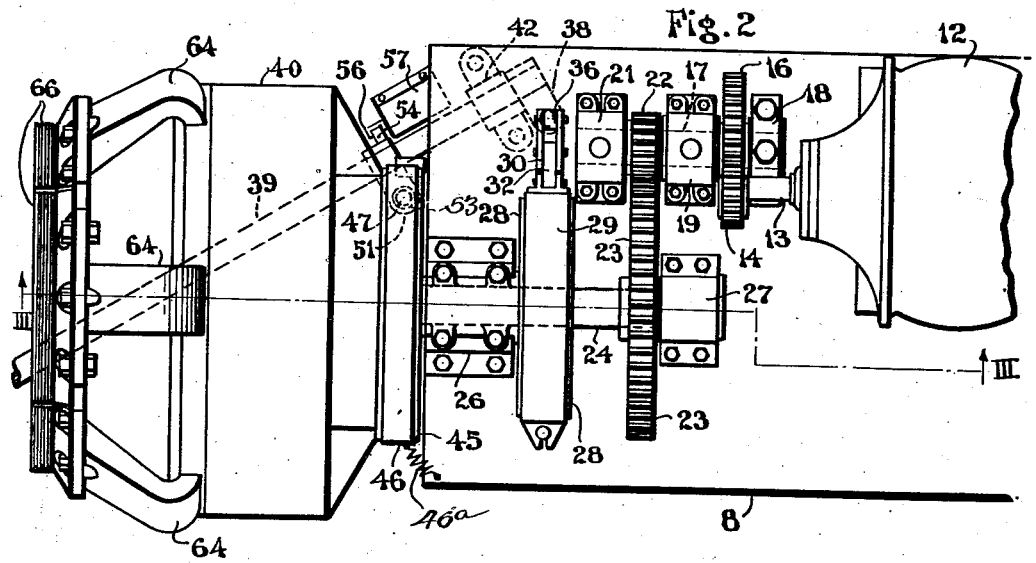
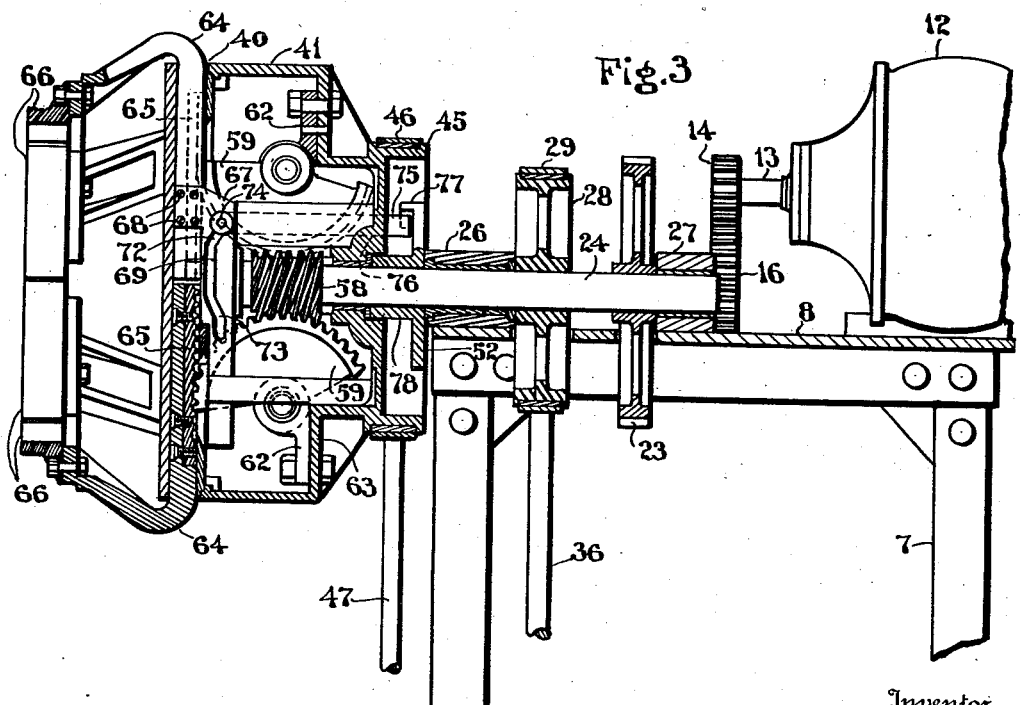
Inventor
Harold M. Brown.
By
Attorney Patented June 10, 1930

1,763,611

UNITED STATES PATENT OFFICE

HAROLD M. BROWN, OF AKRON, OHIO, ASSIGNOR TO THE GOODYEAR TIRE & RUBBER COMPANY, OF AKRON, OHIO, A CORPORATION OF OHIO

TIRE-LINING APPARATUS

Application filed February 9, 1929. Serial No. 338,836.

This invention relates to machines for treating pneumatic tire casings, and it has for its primary object the provision of a machine to facilitate the application of lining material to the interior surfaces of such casings.

More specifically, the invention has for one of its objects the provision of a chuck mechanism for supporting and rotating an unvulcanized tire casing while liquid lining material is applied to the interior thereof.

Another object of the invention is to provide a simple, rugged chuck mechanism adapted to manipulate the casings of various sizes, which is highly efficient in operation.

In the manufacture of automobile tires, it is customary to paint or line the inner surfaces thereof prior to vulcanization with a coating of non-adhesive lining material, such as powdered soapstone or potato flour mixed with a carrier or suspending liquid. This lining material serves to prevent airbags which are employed to expand the tire during vulcanization from adhering to the interior of the tire casing. It further functions to prevent frictional chafing between the inner tubes and the casings when the tire is in actual service upon an automobile.

Heretofore, lining material was applied to the inner surface of the unvulcanized casing while the latter was supported by a single bead upon a rotating chuck of conventional design. The chucks employed for this purpose have been deficient in certain respects; for example, some of them were found to be so complicated in construction as to be likely to require frequent repairing. Other collapsible chucks employed for supporting the tires have been found impracticable because they did not have sufficient range of adjustment to adapt them for supporting various sizes of tires which it might be desirable to treat. The aim of this invention is to provide a mechanism which is peculiarly free from these defects.

For a better understanding of the invention, reference may now be had to the accompanying drawings, forming a part of the specification, of which;

Figure 1 is a side elevational view of a machine constructed according to the provisions of the invention;

Figure 2 is a plan view on a larger scale of the structure shown by Figure 1;

Figure 3 is a cross-sectional view taken substantially along the line III—III of Figure 2 showing the mechanism of the tire supporting chuck;

Figure 4 is a front elevational view of the chuck showing the arrangement of the chuck arms and tire bead engaging jaws which are supported thereby;

Figure 5 is a fragmentary plan view of a portion of the brake operating treadle shaft and the connecting rods therefor taken substantially on the line V—V of Fig. 1; and Figure 6 is a fragmentary elevational view showing in detail the connections between the treadle shaft and the connecting rods.

In practicing the invention, a supporting frame 6 is provided that has two pairs of legs 7 for supporting a platform 8 upon their upper ends. Also, the forward pair of legs support intermediate of their length a shelf or tray 9 which is adapted to support a vessel containing lining fluid. A motor 12 is supported upon the platform 8 at the rear thereof, and is provided with a forwardly projecting drive shaft 13 having a pinion 14 keyed thereon, which actuates a set of reducing gears including a gear 16 mounted upon a horizontally disposed shaft 17. The latter is journalled in suitable bearings 18, 19 and 21, that are rigidly supported upon the platform 8.

A second pinion 22, secured upon the shaft 17 between the bearings 19 and 21, serves to drive a larger gear 23 that is keyed to a main shaft 24. Journal bearings 26 and 27 rotatably support the shaft upon the platform 8, and a brake drum or pulley 28 having a band 29 disposed thereabout is keyed upon the shaft. As shown in Figure 4, one end 29$^a$ of the band 29 is connected to one end of a lever 30, while the other end 29$^b$ thereof is pivoted to one end of a link 32, as indicated at 33. An intermediate portion of the lever 30 is pivotally connected, as indicated at 34, to the other end of the link 32. The outer or free end of the lever 30 has a pivotal connection 35 to an actuating rod 36, which extends beneath the platform 8. As best shown in Figures 1 and 2, the rod 36 is loosely secured by means of a nut 37ª within an opening in an arm 38 that is rigidly secured to a substantially horizontally disposed rotatable treadle shaft 39. One end portion of the shaft 39 is journalled in a bearing 42 and a treadle 43 is rigidly mounted on the other end thereof. A second bearing 44 supports the portion of the shaft adjacent the treadle. Both the bearings 42 and 44 are secured upon a suitable foundation upon which the machine rests.

As best shown by Figure 3, the shaft 24 projects outwardly and serves to support a chuck 40 which is mounted for independent rotation thereon and which includes a cylindrical housing 41 having a flange or drum 45 at the rear thereof and having a brake band 46 disposed thereabout. This brake band is more loosely mounted than the brake band 29, and a spring 46ª tends to draw the band away from the drum 45 whereby to prevent the band from dragging or rubbing on the drums during normal operation of the machine. The upper end of a vertically disposed rod 47 extends through the lower portion of a stirrup link 48, which is attached to one end of the brake band 46, and a compression spring 49 is confined between a nut at the upper end of the rod 47 and the lower end of the link 48 in such manner as to secure a certain degree of resiliency in the application and release of tension upon the brake band. The other end of the brake band is so attached to the table 8 by means of a pin 50 that when the rod 47 is placed under tension the brake band is caused to contract and thus frictionally to engage the surface of the drum.

The lower end of the rod 47 is loosely secured within an opening in an arm 51 (see Figure 2) by means of a nut 51ª on the lower end of the rod in such manner as to permit a slight degree of pivotal movement between the rod and the arm. The arm in turn is rigidly attached to the shaft 39 in parallel relation to the arm 38. Continuous contact between the nut and the rod 47 is secured by means of a spring 52 which is confined between the arm 51 and a collar 53 on the rod 47. Also, the shaft 39 is provided with a lug 54 that extends oppositely from the arm 51 and is adapted to engage and actuate a member 56 of a switch 57, thereby energizing the motor 12, which is connected therewith by means of conventional wiring (not shown).

The shaft 24 is provided with a worm 58 which engages a plurality of radially arranged segmental gears 59, the number of which may be varied as desired and for purposes of illustration six have been shown. The segmental gears are pivotally supported upon brackets 62 which are bolted to an inwardly stepped portion 63 of the rear end of the housing 41. Th housing is provided at its forward end with a plurality of radially arranged rack arms 64 having racks 65 rigidly secured thereto, that intermesh with segmental gears 59. The outer ends of the arms 64 are so bent as to converge inwardly, and they support chuck jaws 66. By rotating the worm 58, the racks are caused to travel radially outwardly or inwardly, according to the direction of relative rotation.

In order to limit the radial movement of the arm 64 in both directions, a plate 67 is rigidly secured to one of the arms by means of screws 68. A slot 69, the limits of which define an actuating cam, includes angularly disposed opposite end portions 72 and 73, and a pin 74 secured to one end of a locking bolt 75 is adapted to actuate the latter linearly through an opening 76 in the housing 41. When the pin 74 is disposed at either end of the slot 69, the bolt lies in the path of a lug 77 that is formed on a collar 78 rigidly secured to the shaft 24.

In the operation of the tire lining machine, a tire casing 80 is placed upon the collapsible jaws 66 of the chuck 40, and the treadle 43 is then depressed, thereby energizing the motor 12, releasing the brake bands 29 and 46, and driving the shaft 24 through the reducing gear train. Because of the static inertia of the chuck 40 and the included mechaism contained within the housing 41, it does not commence rotating until after the worm 58 and the gears 59 have been rotated sufficiently to cause the jaws 66 to be moved radially and to be stopped against the bead of the tire casing, thereby securely gripping the latter. A mop or brush saturated with lining material is then inserted between the beads of the casing and held against the inner surface thereof while it is rotating until such surface has been properly coated.

To stop the mechanism and remove tire casings therefrom, the switch 57 is opened by releasing the treadle 43. The brake band 29 arrests the movement of the drive shaft 24, and since the chuck 40 is comparatively massive, it will continue to rotate because of its kinetic energy after the shaft 24 has been brought to rest. Since the band 46 is more loosely mounted than the band 29, the latter will operate to grip the drum 28 before the former grips the drum 45, thus permitting the continued rotation of the chuck 40 after the shaft 24 has been arrested.

This continued reaction of the chuck upon the shaft causes the segmental gears 59 to be rotated by the worm gear 58, and so to retract the arms 64 radially that the tire bead is released from the chuck jaws 66. When the arms have been moved radially inwardly until the pins 74 engage the end of the angular portion 72 of the slot 69, the bolt 75 engages the lug 77, thereby preventing the jaws 66 from striking each other. Less than one revolution of the worm 59 in the proper direction to move the arms 64 outwardly is sufficient to withdraw the bolt from the path of the lug 77. Likewise, the outward movement of the arms 64 will be arrested when a tire casing is not mounted upon the jaws 66 by engagement of the angular portion 73 of the cam slot with the pin 74, and the consequent engagement of the bolt 75 with the lug 78.

Although I have illustrated only one form which the invention may assume and have described in detail only a single application thereof, it will be apparent to those skilled in the art that the invention is not so limited but that various modifications may be made therein without departing from the spirit of the invention or from the scope of the appended claims.

What I claim is:

1. A chuck mechanism comprising a cylindrical housing, members having racks thereon radially arranged within the housing, individual gears in operative engagement with the racks, means pivotally supporting the gears within the housing, and means operated by inertia of the mechanism for simultaneously actuating the gears.

2. A rotatable chuck mechanism comprising a cylindrical housing, members having racks thereon radially arranged within the housing, gears for operating the racks, means pivotally supporting the gears in radial arrangement within the housing with the planes of the gears intersecting each other, means operated by inertia of the mechanism for simultaneously actuating the segmental gears, and a brake mechanism for stopping rotation of the chuck.

3. A rotatable chuck mechanism comprising a housing, members having racks thereon radially arranged within the housing, radially arranged segmental gears operatively engaging the racks, a drive shaft rotating within the housing having a worm thereon operatively engaging the segmental gears, and means for actuating the drive shaft.

4. A chuck mechanism comprising a housing, radially arranged bars having racks thereon within the housing, radially arranged segmental gears operatively engaging the racks, a drive shaft extending within and rotatable within the housing, a worm gear upon the drive shaft operatively engaging the segmental gears, and means operated by movement of the rack bars for locking the housing and drive shaft to cause them to rotate as a unit.

5. A chuck mechanism comprising a housing radially arranged bars having racks thereon within the housing, radially arranged segmental gears operatively engaging the racks, a drive shaft extending within and rotatable within the housing, a worm gear on the drive shaft operatively engaging the segmental gears, means operated by the extension or retraction of the racks for locking the housing and the drive shaft to cause them to rotate as a unit, and a brake mechanism for stopping rotation of the drive shaft.

6. A tire lining machine comprising a driven shaft, a chuck rotatably mounted upon the shaft, outwardly movable racks radially arranged within the chuck, tire bead engaging jaws supported by the racks, actuating gears engaging the racks, and a worm provided upon the shaft for engaging and actuating the gear.

7. A tire lining machine comprising a driven shaft, radially movable bars having racks thereon rotatably mounted with respect to the shaft, tire bead engaging jaws mounted upon the outer extremities of the bars, means for locking the bars to stop rotation thereof on the shaft, said means comprising a lug rigidly secured to the shaft, a locking bolt associated with the bars, and means on one of the bars adapted to actuate the bolt into engagement with the lug when the bars have moved a predetermined distance.

8. A tire lining machine comprising a driven shaft, radially movable bars rotatably mounted upon the shaft, tire bead engaging jaws mounted upon the outer extremities of the bars, means for locking the bars to stop rotation thereof upon the shaft, said means comprising a lug rigidly secured upon the shaft, a locking bolt associated with the bars and means upon one of the bars adapted to acutate the bolt into engagement with the lug when the bars have reached a predetermined distance, said means comprising a cam member upon the bar and a mating follower upon the bolt.

In witness whereof, I have hereunto signed my name.

Signed at Akron, in the county of Summit and State of Ohio, U. S. A., this 7th day of February, 1929.

HAROLD M. BROWN.